United States Patent [19]
Hudson

[11] Patent Number: 5,685,266
[45] Date of Patent: Nov. 11, 1997

[54] RING GEAR PUMPS

[75] Inventor: Eric B. Hudson, Hilbert, Wis.

[73] Assignee: Brunswick Corporation, Lake Forest, Ill.

[21] Appl. No.: 472,892

[22] Filed: Jun. 7, 1995

[51] Int. Cl.[6] .................................................. F01M 1/02
[52] U.S. Cl. .................. 123/196 R; 418/165; 123/196 W
[58] Field of Search .......................... 123/196 R, 196 A, 123/196 W; 418/165

[56] References Cited

U.S. PATENT DOCUMENTS

| | | | |
|---|---|---|---|
| 1,287,118 | 12/1918 | Shore | 418/165 |
| 3,802,813 | 4/1974 | Butler | 418/165 |
| 4,138,206 | 2/1979 | Zinevich et al. | 418/165 |
| 4,249,750 | 2/1981 | Kantner | 418/165 |
| 4,347,700 | 9/1982 | Kantner et al. | 418/165 |
| 5,085,188 | 2/1992 | Gasparri et al. | 123/196 A |
| 5,215,164 | 6/1993 | Shibata | 184/6.13 |
| 5,454,354 | 10/1995 | Miller | 123/196 A |

FOREIGN PATENT DOCUMENTS 759944  11/1944  Germany .......................... 418/165

Primary Examiner—Erick R. Solis
Attorney, Agent, or Firm—Wood, Phillips, VanSanten, Clark & Mortimer

[57] ABSTRACT

Bulk and complexity of a lubrication system incorporated in an internal combustion engine (10) having an engine block (11), a power shaft (12) mounted in the engine block for rotation about a power shaft axis, a combustion chamber (18), a valve arrangement (20) for controlling intake to and exhaust from the combustion chamber (18), a cam device (22) for actuating the valve arrangement (20), and a pressurized oil lubrication system (15) is avoided in a construction wherein the cam device (22) and the pressurized oil lubrication system (15) include a ring cam (24) journalled on the block (11). The ring cam (24) has an outer cam-shaped periphery (26) for actuating the valve arrangement (20), and an inner periphery (35) configured as a ring gear (36). The cam device (22) and the pressurized oil lubrication system (15) further include a drive gear (38) driven by the power shaft (12) and located within the ring gear (36) of the ring cam (24) and meshed therewith at a predetermined mesh point (D) to define a gear pump therewith. One side of the mesh point (D) defines a suction side of the gear pump and has an oil inlet (78) thereat. The other side of the mesh point (D) defines a discharge side of the gear pump and has an oil outlet (86) thereat.

14 Claims, 5 Drawing Sheets

RING GEAR PUMPS

FIELD OF THE INVENTION

This invention generally relates to the art of pumps and, more particularly, pumps used for circulating lubricating oil within an internal combustion engine.

BACKGROUND OF THE INVENTION

The use of pumps to circulate lubricating oil employed in an engine or gearbox has long been known. It is common for such lubrication systems to employ a dry sump arrangement wherein a first pump, typically referred to as a "scavenge pump", removes oil from a sump located in a lower portion of an engine or gearbox and pumps the oil to an oil reservoir. The oil dwells in the oil reservoir for a period of time during which the oil may be allowed to cool and/or deaerate before the oil is drawn from the tank by a second pump, typically referred to as a "pressure feed pump", and pumped to the preesurized oil lubrication network of an engine or gearbox.

It is also known in the industry to utilize gear pumps for both the scavenge pump and the pressure feed pump. Such pumps are typically provided with an inlet port on the disengaging side of the mesh point of the gears and an outlet port on the engaging side of the mesh point. The disengaging gear teeth create suction which draws oil from the inlet into the tooth spaces vacated by the gear teeth of the mating gear. When the teeth re-engage on the opposite side of the mesh point, the oil that had been drawn into the tooth spaces is forced from the tooth spaces into the outlet port by the gear teeth of the mating gear.

Gear pumps are fixed displacement pumps, the flow from which is dependent on the size of the gear tooth spaces and the rotational speed of the gears. Thus, the size of the gear pump and the speed at which it will run become important considerations when designing a lubrication system requiring a minimum predetermined oil flow rate. Because a gear pump may be designed to a smaller size by increasing its operating speed to achieve a predetermined flow rate, it is common for such pumps to be provided with a high-speed drive shaft driven by a dedicated speed-increasing transmission, such as a gear train or a belt and pulley system.

It is also common, for purposes of packaging, to stack the scavenge pump and the pressure feed pump one above the other on a common drive shaft, with each pump having dedicated housings consisting of port plates and covers. This allows both pumps to be driven by the same shaft.

While such pumps are capable of satisfactory performance, they do not necessarily lend themselves to compact and/or low-cost engine and gearbox design. For example, the use of dedicated components for the speed-increasing transmission and the pump housings increases the overall cost of the engine and/or gearbox. Further, while stacking the scavenge pump and the pressure feed pump along the same power shaft alleviates the necessity of providing two dedicated speed-increasing transmissions, such stacking limits the ability to provide a compact design.

Additionally, these pumps typically perform only a single function, pumping, and their components are not easily adapted to performing additional functions necessary for the operation of the engine and/or gearbox.

Thus, it can be seen that there is a need for a compact scavenge pump and pressure feed pump design which can be incorporated within an engine and/or gearbox while requiring a reduced number of dedicated components and which may be adapted to perform additional engine and/or gearbox functions.

SUMMARY OF THE INVENTION

It is a principal object of the invention to provide a new and improved pump configuration. More specifically, it is an object to provide a compact scavenge pump and pressure feed pump configuration that can be used in conjunction with the lubrication system of an engine and/or gearbox while minimizing the number of dedicated components. It is a further object of the invention to provide a pump configuration wherein selected components of the pump may perform other functions necessary for the operation of the engine and/or gearbox.

In a preferred embodiment, the invention is incorporated in an internal combustion engine having an engine block, a power shaft mounted in the engine block for rotation about a power shaft axis, a combustion chamber, a valve arrangement for controlling intake to and exhaust from the combustion chamber, a cam device for actuating the valve arrangement, and a pressurized oil lubrication system. The cam device and the pressurized oil lubrication system include a ring cam journalled on the block. The ring cam has an outer cam-shaped periphery for actuating the valve arrangement, and an inner periphery configured as a ring gear. The cam device and the pressurized oil lubrication system further include a drive gear driven by the power shaft and located within the ring gear of the ring cam and meshed therewith at a predetermined mesh point to define a gear pump therewith. One side of the mesh point defines a suction side of the gear pump and has an oil inlet thereat. The other side of the mesh point defines a discharge side of the gear pump and has an oil outlet thereat.

In another preferred embodiment, the invention is incorporated in an internal combustion engine including an engine block, a power shaft mounted in the engine block for rotation about a power shaft axis, a combustion chamber, a valve arrangement for controlling intake to and exhaust from the combustion chamber, a cam device for actuating the valve arrangement, and a pressurized oil lubrication system. The cam device and the pressurized oil lubrication system include a ring cam journalled on the block and having an outer cam-shaped periphery for actuating the valve arrangement and an inner periphery configured as a ring gear. The cam device and the pressurized oil lubrication system further include a first gear driven by the power shaft and located within the ring gear for driving the ring gear, and a second gear journalled to the block and meshed with one of the first gear and the ring gear at a predetermined mesh point to define a gear pump therewith. One side of the mesh point defines a suction side of the gear pump and has an oil inlet thereat, with the other side of the mesh point defining a discharge side of the gear pump and having an oil outlet thereat.

According to one facet of the invention, at least one of the gears is rotatably mounted to the engine block by a dowel fixed to the block and passing through a central opening in the gear.

According to another facet of the invention, a cover plate is provided for covering the gears and is aligned with the engine block by a dowel which passes through a central opening in one of the gears for rotatably mounting the gear to the engine block.

In yet another embodiment, the invention is incorporated in an internal combustion engine having an engine block, a power shaft mounted in the engine block for rotation about a power shaft axis, a combustion chamber, a valve arrangement for controlling intake to and exhaust from the combustion chamber, a cam device for actuating the valve arrangement, and a pressurized oil lubrication system. The cam device and the pressurized lubrication system include a ring cam having a generally ring-shaped body with an inner periphery and an outer periphery. A cam surface is provided on the outer periphery of the body for actuating the valve arrangement as the ring cam is rotated about a cam axis. An internal gear is provided on the inner periphery of the ring cam. First, second, and third gears are nested inside the internal gear, with the first gear meshing with the internal gear at a first mesh point, the second gear meshing with the first gear at a second mesh point, and the third gear meshing with the second gear at a third mesh point and the internal gear at a fourth mesh point. As the gears are rotated, there are engaging gear teeth and disengaging gear teeth associated with each of the mesh points. At least two of the mesh points are operably associated with the pressurized oil lubrication system to circulate oil therethrough.

According to one facet of the invention, the pressurized oil lubrication system further includes an oil tank, an oil distribution network, a scavenge outlet port for transferring oil to the oil tank from the engaging teeth of at least one of the mesh points, a pressure inlet port for supplying oil from the oil tank to the disengaging teeth of at least one of the mesh points, and at least one pressure outlet port for transferring oil to the distribution network from the engaging teeth of one of the mesh points.

According to another facet of the invention, the pressurized oil lubrication system further includes a scavenge sump, an oil tank, an oil distribution network, four inlet ports with each inlet port being associated with one of the mesh points for supplying oil to the disengaging gear teeth of the mesh point, and four outlet ports with each outlet port being associated with one of the mesh points for accepting oil from the engaging gear teeth of the mesh point. One of the inlet ports is connected to the scavenge sump to supply oil therefrom. One of the outlet ports is connected to the oil tank to supply oil thereto. One of the inlet ports is connected to the oil tank to obtain oil therefrom, and one of the outlet ports is connected to the oil distribution network to supply oil thereto.

According to yet another facet of the invention, a bypass is provided for connecting one of the outlet ports to one of the inlet ports to bypass oil from the outlet port to the inlet port.

In yet another preferred embodiment, the invention is incorporated in an engine having an oil lubrication system including a scavenge sump, an oil tank, an oil distribution network, a scavenge pump for transferring oil from the scavenge pump to the oil tank, and a pressure pump for transferring oil from the oil tank to the oil distribution network. The scavenge pump and the pressure pump include an internal gear, a first gear nested inside the internal gear and meshing with the internal gear at a first mesh point, a second gear nested inside the internal gear and meshing with the first gear at a second mesh point, a third gear nested inside the internal gear and meshing with the second gear at a third mesh point and the internal gear at a fourth mesh point. As the gears are rotated, there are engaging gear teeth and disengaging gear teeth associated with each of the mesh points. A scavenge inlet port is provided for supplying oil from the scavenge sump to the disengaging gear teeth of one of the mesh points. A scavenge outlet port is provided for transferring oil to the oil tank from the engaging gear teeth of one of the mesh points. A pressure inlet port is provided for supplying oil from the oil tank to the disengaging gear teeth of one of the mesh points, and a pressure outlet port is provided for transferring oil to the distribution network from the engaging gear teeth of one of the mesh points.

According to one facet of the invention, a power shaft is nested inside of the internal gear and drives the internal gear.

In another embodiment, the invention is a combination scavenge pump and pressure pump device for operation with a lubrication system of a power system including an engine or motor. The device includes a scavenge pump inlet, a scavenge pump outlet, a pressure pump inlet, a pressure pump outlet, an internal gear, a first gear nested inside the internal gear and meshing with the internal gear at a first mesh point, a second gear nested inside the internal gear and meshing with the first gear at a second mesh point, a third gear nested inside the internal gear and meshing with the second gear at a third mesh point and the internal gear at a fourth mesh point. As the gears are turned, there are engaging gear teeth and disengaging gear teeth at each of the mesh points. A first inlet port is provided adjacent the first mesh point for supplying oil to the disengaging gear teeth of the first gear and the internal gear. A first outlet port is provided adjacent the first mesh point for accepting the oil from the engaging gear teeth of the first gear in the internal gear. A second inlet port is provided adjacent the second mesh point for supplying oil to the disengaging gear teeth of the second gear in the first gear. A second outlet port is provided adjacent the second mesh point for accepting oil from the engaging gear teeth of the second gear in the first gear. A third inlet port is provided adjacent the third mesh point for supplying oil to the disengaging gear teeth of the third gear and the second gear. A third outlet port is provided adjacent the third mesh point for accepting oil from the engaging gear teeth of the third gear and the second gear. A fourth inlet port is provided adjacent the fourth mesh point for supplying oil to the disengaging gear teeth of the internal gear and the third gear. A fourth outlet port is provided adjacent the fourth mesh point for accepting oil from the engaging gear teeth of the internal gear and the third gear. At least one of the first inlet port and the third inlet port is connected with the scavenge pump inlet to supply of oil therefrom. At least one of the second outlet port and the fourth outlet port is connected with the scavenge pump outlet to supply oil thereto. At least one of the second inlet port and the fourth inlet port is connected with the pressure pump inlet to supply of oil therefrom, and at least one of the first outlet port and the third outlet port is connected with the pressure pump outlet to supply oil thereto.

Other objects and advantages will become apparent from the following specification taken in conjunction with the accompanying drawings.

DESCRIPTION OF THE PREFERRED EMBODIMENTS

Figure 1:
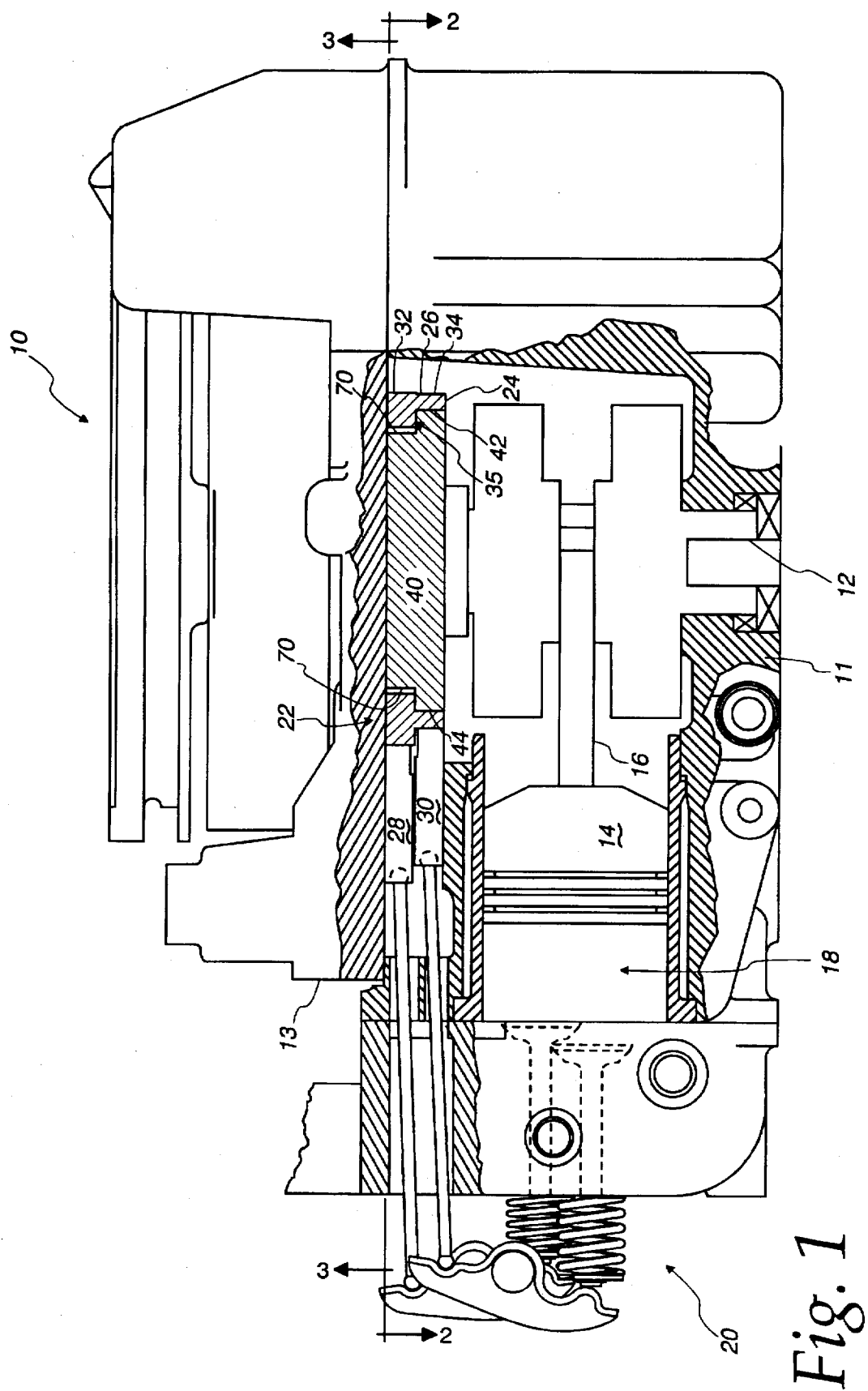
FIG. 1 is a side elevational view partially in section of an engine having a dual pump embodying the invention.

An exemplary embodiment of a dual pump made according to the invention is described herein and is illustrated in the drawings in connection with an oil pumping function for the pressurized dry sump lubrication system of an internal combustion engine. However, it should be understood that the invention may find utility in other applications, and that no limitations to use as a combination scavenge and pressured feed pump for the pressurized oil lubrication system of an internal combustion engine is intended except insofar as expressly stated in the appended claims.

Figure 5:
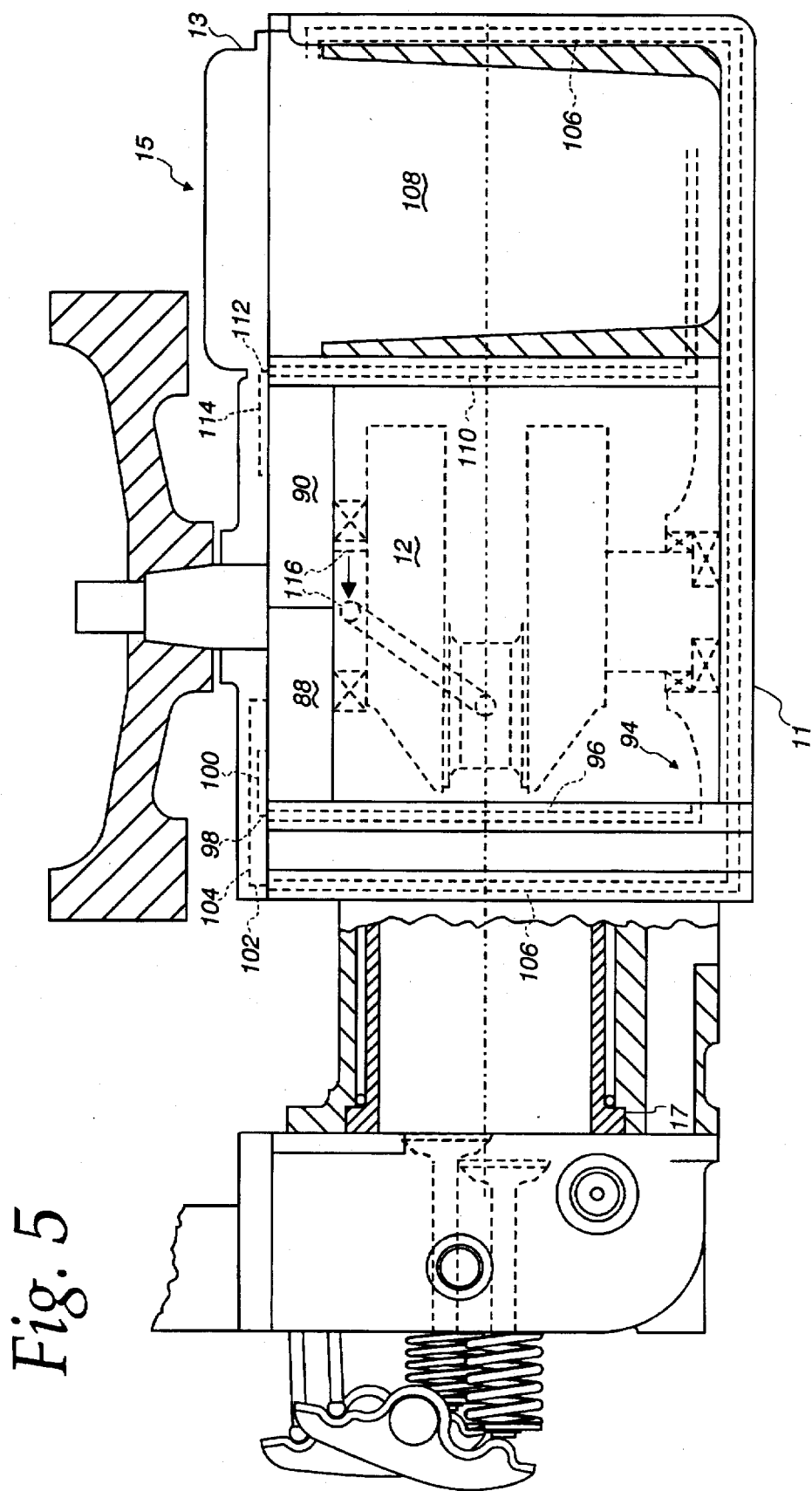
FIG. 5 is a schematic representation of the pressurized oil lubrication system of the engine shown in FIG. 1.

With reference to FIG. 1, an internal combustion engine is fragmentarily shown at 10 and includes an engine block 11 containing a crankshaft power shaft 12 which is rotationally driven by a piston 14 through a connecting rod 16 when fuel is combusted in the combustion chamber 18. A valve arrangement 20 controls the intake of fuel into the combustion chamber 18 and the exhaust of combustion products from the combustion chamber 18. A cam/dual pump device 22 actuates the valve arrangement 20, timing the opening and closing of the valve arrangement 20 with respect to the position of the piston 14 and the power shaft 12, and pumps oil through a pressurized oil lubrication system 15, as shown in FIG. 5. An engine block cover 13 encloses the engine components within the engine block 11.

Figure 2:
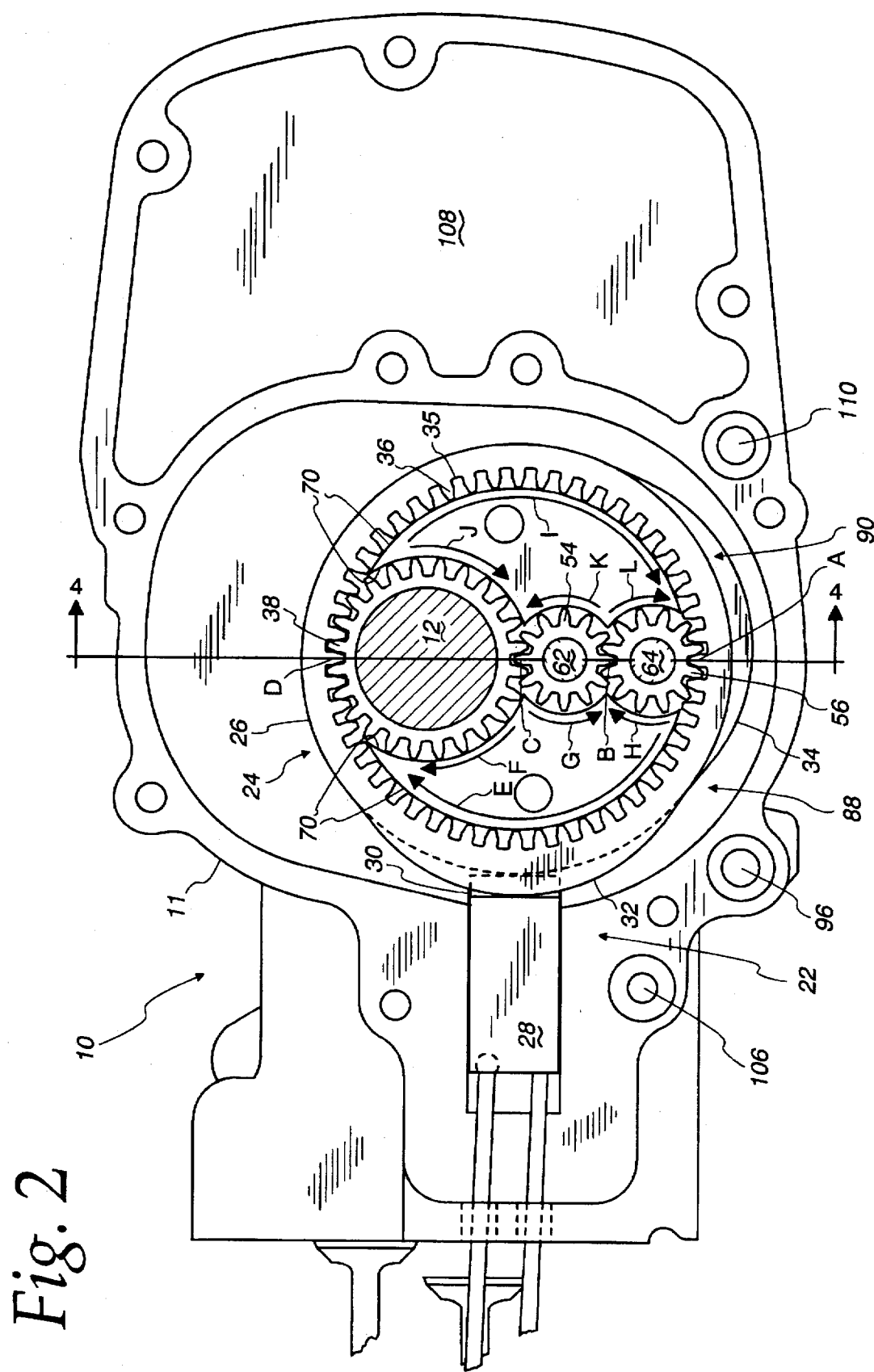
FIG. 2 is a sectional view of the engine shown in FIG. 1 taken substantially along the line 2—2 of FIG. 1.

The cam/dual pump device 22 includes a ring cam 24 having an outer cam-shaped periphery 26 which drives a pair of cam followers 28 and 30 for actuating the valve arrangement 20. The outer cam-shaped periphery 26 of the ring cam 24 includes two axially-spaced lobes 32 and 34, with the upper lobe 32 being provided to drive the cam follower 28 and the lower lobe 34 being provided to drive the cam follower 30. The ring cam 24 further includes an inner periphery 35. As best seen in FIG. 2, part of the inner periphery 35 is configured as a ring gear 36 which is meshed with and driven by a drive gear 38 nested within the inner periphery 35. The drive gear 38, preferably but not necessarily, is mounted on and fixed to the power shaft 12 so that it will rotate therewith.

The pitch diameter of the drive gear 38 is one-half the pitch diameter of the ring gear 36, thereby producing one revolution of the ring cam 24 for every two revolutions of the power shaft 12. Thus, the lobes 32 and 34 of the ring cam 24 actuate the valve arrangement once for intake and once for exhaust for every two revolutions of the power shaft 12 and every four strokes of the piston 14. This relationship is appropriate for a four-cycle engine. The cam lobe 32 is angularly spaced from cam lobe 34 by approximately 105° to provide for the proper timing of the opening and closing of the intake and exhaust valves, as is well known.

It will be appreciated that, while the illustrated embodiment discloses the cam lobes 32 and 34 in the proper angular orientation with the proper gear ratio between the ring gear 36 and the drive gear 38 for the operation of a single cylinder four-cycle engine, the invention anticipates other engine configurations. Therefore, the gear ratio between the ring gear 36 and the drive gear 38, and the number of cam lobes and their associated angular orientations are not limited to those illustrated.

Figure 4:
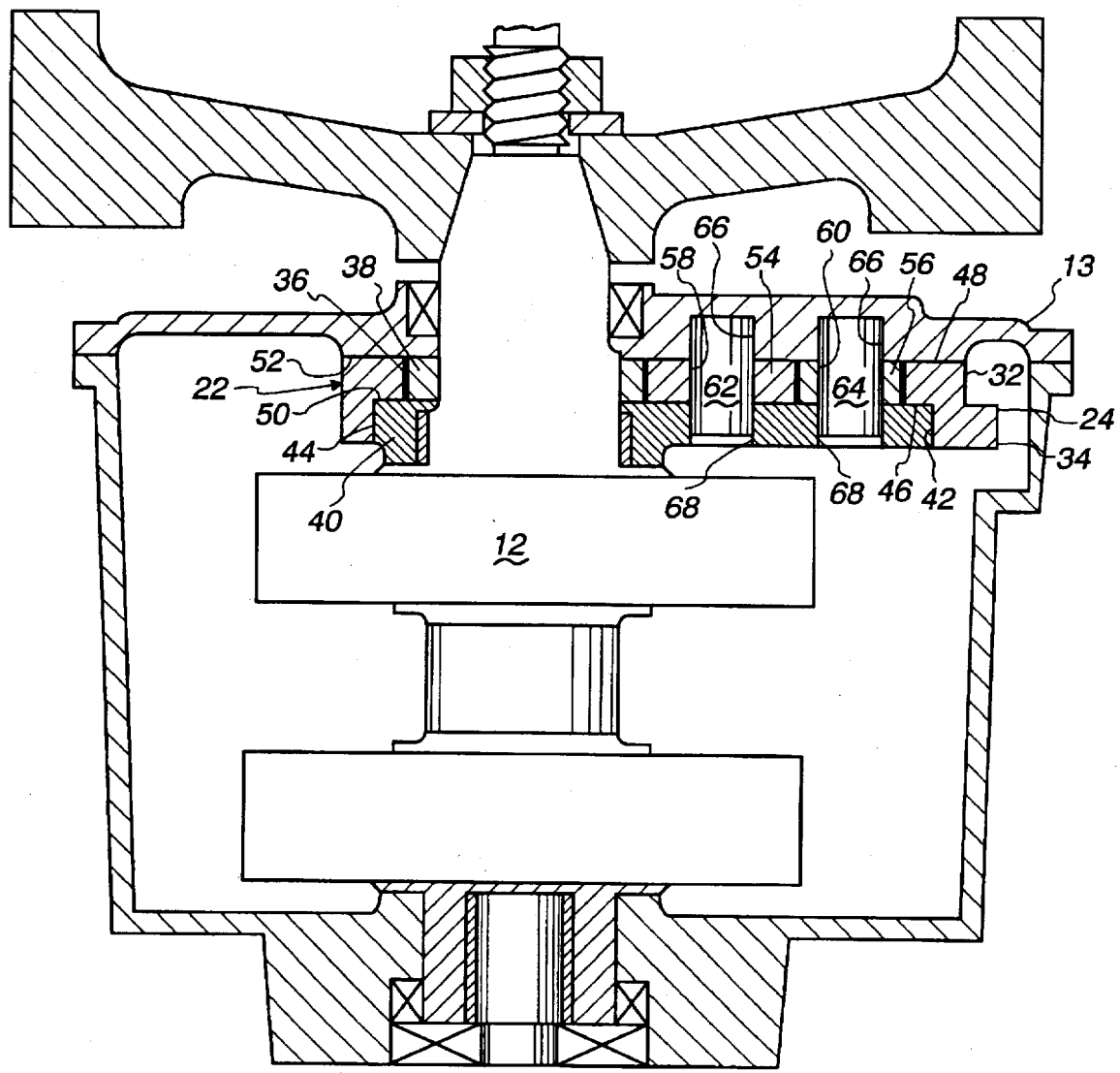
FIG. 4 is a sectional view of the engine shown in FIG. 1 taken substantially along the line 4—4 of FIG. 2.

As best seen in FIG. 4, the ring cam 24 is journalled on a bearing/pump housing 40 which also journals the power shaft 12. More specifically, a plain bearing 42 is provided on the inner periphery 35 of the ring cam 24 for rotatably mounting the ring cam 24 to a journal surface 44 on the bearing/pump housing 40. Further, axially-spaced plain thrust surfaces 46 and 48 are provided on the ring cam 24 to react axial loads against plain thrust surfaces 50 and 52 on the bearing/pump housing 40 and the engine block cover 13, respectively.

As best seen in FIGS. 2 and 4, the cam/dual pump device 22 further includes a second gear 54 mating with the drive gear 38, and a third gear 56 mating with the second gear 54 and the ring gear 36. The second and third gears 54 and 56 are mounted by plain bearings 58 and 60 to journal pins/dowels 62 and 64, respectively. The dowels 62 and 64 are mounted in bores 66 in the block cover 13 and bores 68 in the bearing/pump housing 40. The dowels 62 and 64 perform the dual function of rotatably mounting the second and third gears 54 and 56 and accurately locating the bearing/pump housing 40 relative to the block cover 13.

It will be appreciated that while in the preferred embodiment the drive gear 38 is a source of power input into the cam/dual pump device 22, the invention anticipates that any of the gears 36, 38, 54 and 56 may be utilized as the source of power input.

Turning now in greater detail to the dual pump portion of the cam/dual pump device 22, as best seen in FIG. 2, the bearing/pump housing 40 has been provided with contoured surfaces 70 which serve to shroud the gear teeth of the gears 36, 38, 54 and 56. The depth of the contoured surfaces 70 approximates the axial width of the gears 36, 38, 54 and 56, but is at least slightly larger so that the gears 36, 38, 54 and 56 are not bound between the bearing/pump housing 40 and the cover 13. The contoured surfaces 70 and the thrust surfaces 50 and 52 function to entrap oil within the vacant tooth spaces of the gears 36, 38, 54 and 56 during operation of the cam/dual pump 22.

As best seen in FIG. 2, the ring gear 36 meshes with the third gear 56 at a first mesh point A. The third gear 56 meshes with the second gear 54 at a second mesh point B. The second gear 54 meshes with the drive gear 38 at a third mesh point C, and the drive gear 38 meshes with the ring gear 36 at a fourth mesh point D.

Figure 3:
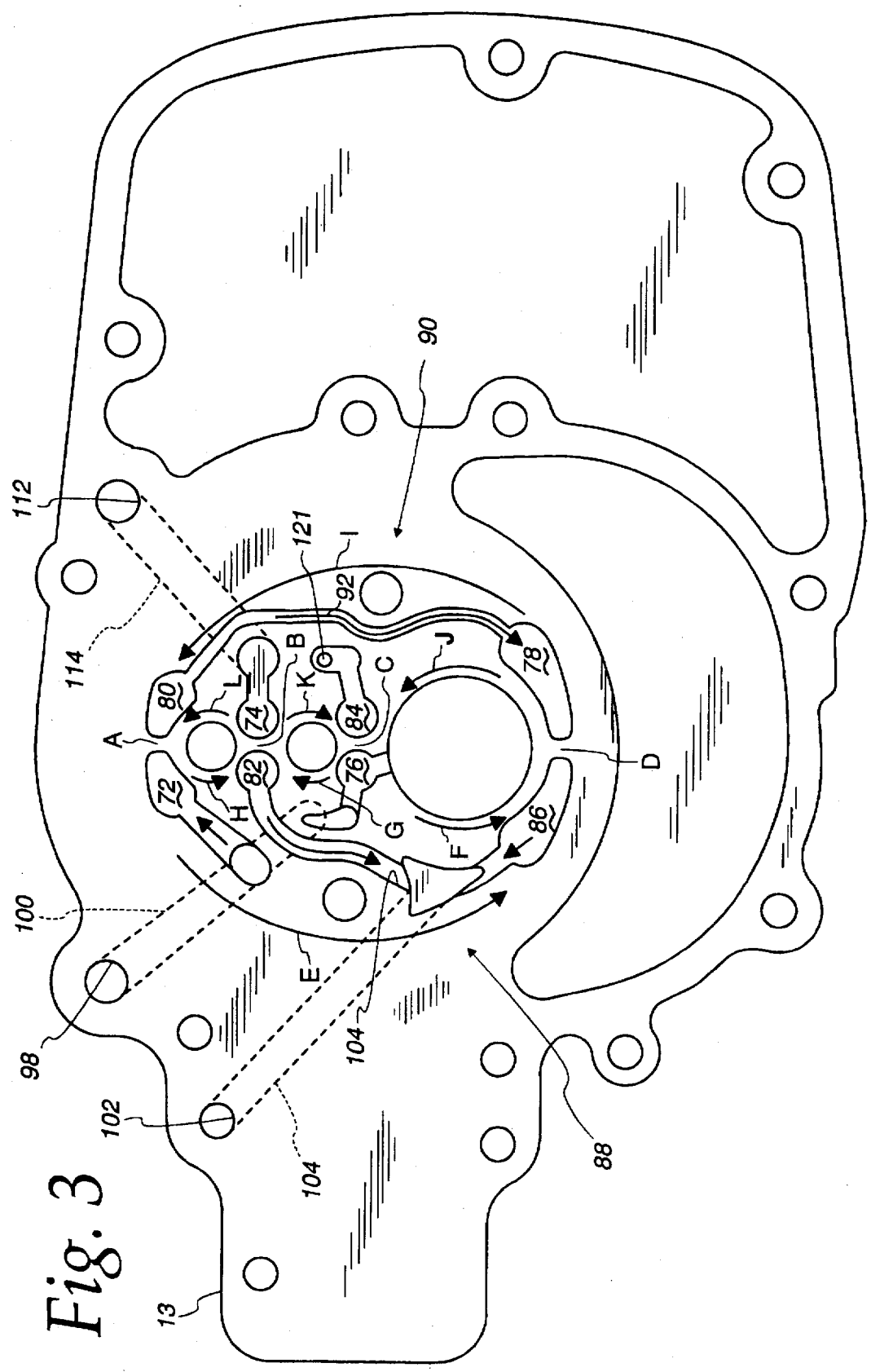
FIG. 3 is a sectional view of the engine shown in FIG. 1 taken substantially along the line 3—3 of FIG. 1.

As best seen in FIG. 3, the block cover 13 is provided with inlet ports 72, 74, 76 and 78 for supplying oil to the disengaging gear teeth at mesh points A, B, C and D, respectively. The block cover 13 is also provided with outlet ports 80, 82, 84, and 86 for accepting oil from the engaging gear teeth at mesh points A, B, C and D, respectively.

Thus, the inlet ports 72 and 76 and the outlet ports 82 and 86 cooperate together with the gear teeth of the gears 36, 38, 54 and 56 to form a scavenge pump 88 on one side of the dual pump device 22, while the inlet ports 74 and 78, and the outlet ports 80 and 84 cooperate together with the gear teeth of the gears 36, 38, 54 and 56 to form a pressure feed pump 90 on the other side of the pump device 22.

The operation of the scavenge pump 88 and the pressure feed pump 90 of the pump device 22 can best be explained with reference to flow lines E, F, G, H, I, J, K, and L which illustrate the flow path of the oil entrapped in the tooth spaces of the gears 36, 38, 54 and 56, as shown in FIGS. 2 and 3.

With respect to the scavenge pump 88, oil is drawn to the scavenge pump 88 through inlet ports 72 and 76 by the disengaging gear teeth of the gears 36, 38, 54 and 56 at the mesh points A and C, respectively. The oil is then entrapped in the tooth spaces by the contoured surfaces 70 and the thrust surfaces 50 and 52 and forced by the gear teeth of the gears 36, 38, 54 and 56 to follow flow lines E, F, G, and H, respectively. The oil is then forced from the tooth spaces into the outlet ports 82 and 86 by the engaging gear teeth of the gears 36, 38, 54 and 56 at the mesh points B and D. Thus, oil is pumped from the inlet port 72 to the outlet ports 82 and 86 by the third gear 56 and the ring gear 38, respectively, along the flow lines H and E, respectively. Oil is pumped from the inlet port 76 to the outlet ports 82 and 86 by the second gear 54 and the drive gear 38, respectively, along the flow lines G and F, respectively.

With respect to the pressure feed pump 90, the inlet ports 74 and 78 supply oil to the disengaging gear teeth of the gears 36, 38, 54 and 56 at the mesh points B and D, respectively. The oil is then entrapped in the tooth spaces of gears 36, 38, 54 and 56 by the contoured surfaces 70 and the thrust surfaces 50 and 52 and forced by the gear teeth of gears 36, 38, 54 and 56 to move along the flow lines I, J, K and L, respectively. The oil is then forced from the tooth spaces of the gears 36, 38, 54 and 56 into the outlet ports 80 and 84 by the engaging gear teeth at the mesh points A and C. Thus oil is pumped from the inlet port 74 to the outlet ports 80 and 84 by the third gear 56 and the second gear 54, respectively, along the flow lines L and K, respectively. Oil is pumped from the inlet port 78 to the outlet ports 80 and 84 by the ring gear 36 and the drive gear 38, respectively, along the flow lines I and J, respectively.

Typically, dry sump pressure lubrication systems require a scavenge pump flow capacity that is greater than the pressure feed pump flow capacity by a ratio in the range of 2:1 to 4:1. In the illustrated embodiment, a flow capacity ratio of 2:1 is provided by a by-pass flow channel 92 which connects the outlet port 80 to the inlet port 78. The flow channel 92 has the effect of "shorting-out" the outlet port 80 and the inlet port 78, thereby reducing the flow capacity of the pressure feed pump 90 by one-half.

As best seen in FIG. 3, a relief valve 121 is provided in the cover 13 between the outlet port 84 and the inlet port 74 for regulating the oil outlet pressure and/or flow from the pressure feed pump 90. Relieving the regulating oil flow from the outlet port 84 to the inlet port 74 minimizes the rate at which oil is recirculated through the pressurized oil lubrication system 15, thereby improving the oil deaeration and cooling characteristics of the lubrication system 15.

A schematic of the pressurized oil lubrication system 15 is illustrated in FIG. 5. Scavenge oil is drawn from a sump 94 via a scavenge oil passage 96 to a scavenge inlet port 98 formed in the cover 13. The oil is transferred from the scavenge inlet port 98 to the inlet ports 72 and 76 of the scavenge pump 88 via scavenge oil passages 100 formed in the cover 13. After being pumped by the gears 36, 38, 54 and 56 to the outlet ports 82 and 86 of the scavenge pump 88, the oil is transferred to a scavenge pump outlet 102 formed in the cover 13 via scavenge oil passages 104, also formed in the cover 13. The scavenge oil then is transferred by scavenge oil passages 106 to an oil tank 108 formed in the engine block 11. The oil then dwells in the oil tank 108 for a period of time during which it may be allowed to cool and/or deaerate before being drawn off through oil passages 110 to a pressure pump inlet 112 formed in the cover 13. The oil is transferred from the pressure pump inlet 112 to the inlet port 74 of the pressure feed pump 90 via oil passages 114 formed in the cover 13. After the oil is pumped from the inlet port 74 to the outlet port 84 of the pressure feed pump 90 by the gears 36, 38, 54 and 56, the oil is transferred to an oil distribution network 116 formed in the bearing/pump housing 40 and the power shaft 12 whereby the oil is supplied to the rotating components of the engine 10. The oil distribution network 116 may be conventional or of any desired configuration.

Thus, the cam/dual pump device 22 provides the multiple functions of actuating the valve arrangement 20, pumping oil from the scavenge sump 94 to the oil tank 108, and pumping oil from the oil tank 108 to the oil distribution network 116. These functions are provided by the ring cam 24, the ring gear 36, the drive gear 38, the second gear 54, the third gear 56, the bearing/pump housing 40, and the engine block cover 13. Actuation of the valve arrangement is provided by the outer cam-shaped periphery 26 of the ring cam 24 which is driven through the ring gear 36 by the drive gear 38 mounted on the power shaft 12. The pumping of oil from the sump 94 to the oil tank 108 and from the oil tank 108 to the oil distribution network 116 is provided by the scavenge pump 88 and the pressure feed pump 90 which include the ring gear 36, the drive gear 38, the second gear 54, and the third gear 56 working in cooperation with inlet ports 72, 74, 76, and 78 and outlet ports 80, 82, 84, and 86 formed in the engine block cover 13.

I claim:

1. In an engine including an engine block, a power shaft mounted in the engine block for rotation about a power shaft axis, and a pressurized oil lubrication system; the improvement wherein said pressurized oil lubrication system comprises:

an internal gear;

a first gear nested inside the internal gear and meshing with the internal gear at a first mesh point;

a second gear nested inside the internal gear and meshing with the first gear at a second mesh point;

a third gear nested inside the internal gear and meshing with the second gear at a third mesh point and the internal gear at a fourth mesh point;

engaging gear teeth and disengaging gear teeth at each of the mesh points;

at least two of the mesh points being operably associated with the pressurized oil lubrication system to circulate oil therethrough.

2. In an engine including an engine block, a power shaft mounted in the engine block for rotation about a power shaft axis, and a pressurized oil lubrication system; the improvement wherein the pressurized oil lubrication system comprises:

an internal gear;

a first gear nested inside the internal gear and meshing with the internal gear at a first mesh point;

a second gear nested inside the internal gear and meshing with the first gear at a second mesh point;

a third gear nested inside the internal gear and meshing with the second gear at a third mesh point and the internal gear at a fourth mesh point;

engaging gear teeth and disengaging gear teeth at each of the mesh points;

at least two of the mesh points being operably associated with the pressurized oil lubrication system to circulate oil therethrough;

an oil tank;

an oil distribution network;

at least one scavenge outlet port for transferring oil to the oil tank from the engaging gear teeth of at least one of the mesh points;

at least one pressure inlet port for supplying oil from the oil tank to the disengaging gear teeth of at least one of the mesh points; and at least one pressure outlet port for transferring oil to the distribution network from the engaging gear teeth of at least one of the mesh points.

3. In an engine including an engine block, a power shaft mounted in the engine block for rotation about a power shaft access, and a pressurized oil lubrication system; the improvement wherein the pressurized lubrication system comprises:

an internal gear;

a first gear mounted inside the internal gear and meshing with the internal gear at a first mesh point;

a second gear nested inside the internal gear and meshing with the first gear at a second mesh point;

a third gear nested inside the internal gear and meshing with the second gear at a third mesh point and the internal gear at a fourth mesh point;

engaging gear teeth and disengaging gear teeth at each of the mesh points;

at least two of the mesh points being operably associated with the pressurized oil lubrication system to circulate oil therethrough;

four inlet ports, each inlet port being associated with one of the mesh points for supplying oil to the disengaging gear teeth of the mesh points;

a scavenge sump;

an oil tank;

an oil distribution network;

four outlet ports, each outlet port being associated with one of the mesh points for accepting oil from the engaging gear teeth of the mesh points;

at least one of the inlet ports being connected to the scavenge sump to supply oil therefrom;

at least one of the outlet ports being connected to the oil tank to supply oil thereto;

at least one of the inlet ports being connected to the oil tank to supply oil therefrom; and at least one of the outlet ports being connected to the oil distribution network to supply oil thereto.

4. The improvement of claim 3 further comprising a bypass for connecting one of the outlet ports to one of the inlet ports to bypass oil from the outlet port to the inlet port.

5. In an engine having an oil lubrication system including a scavenge sump, an oil tank, an oil distribution network, a scavenge pump for transferring oil from the scavenge sump to the oil tank, and a pressure pump for transferring oil from the oil tank to the oil distribution network; the improvement wherein said scavenge pump and said pressure pump comprise:

an internal gear;

a first gear nested inside the internal gear and meshing with the internal gear at a first mesh point;

a second gear nested inside the internal gear and meshing with the first gear at a second mesh point;

a third gear nested inside the internal gear and meshing with the second gear at a third mesh point and the internal gear at a fourth mesh point;

engaging gear teeth and disengaging gear teeth at each of the mesh points;

at least one scavenge inlet port for supplying oil from the scavenge sump to the disengaging gear teeth of at least one of the mesh points;

at least one scavenge outlet port for transferring oil to the oil tank from the engaging gear teeth of at least one of the mesh points;

at least one pressure inlet port for supplying oil from the oil tank to the disengaging gear teeth of at least one of the mesh points; and at least one pressure outlet port for transferring oil to the distribution network from the engaging gear teeth of at least one of the mesh points.

6. The improvement of claim 5 further comprising a bypass for connecting at least one of the outlet ports to at least one of the inlet ports to bypass oil therebetween.

7. The improvement of claim 5 further comprising a power shaft nested inside of the internal gear and driving the internal gear.

8. A combination scavenge pump and pressure pump device for operation with a lubrication system of a power system having an engine, the device comprising:

a scavenge pump inlet;

a scavenge pump outlet;

a pressure pump inlet;

a pressure pump outlet;

an internal gear;

a first gear nested inside the internal gear and meshing with the internal gear at a first mesh point;

a second gear nested inside the internal gear and meshing with the first gear at a second mesh point;

a third gear nested inside the internal gear and meshing with the second gear at a third mesh point and the internal gear at a fourth mesh point;

engaging gear teeth and disengaging gear teeth at each of the mesh points;

a first inlet port adjacent the first mesh point for supplying oil to the disengaging gear teeth of the first gear and the internal gear;

a first outlet port adjacent the first mesh point for accepting oil from the engaging gear teeth of the first gear and the internal gear;

a second inlet port adjacent the second mesh point for supplying oil to the disengaging the second teeth of the second gear and the first gear;

a second outlet port adjacent the second mesh point for accepting oil from the engaging gear teeth of the second gear and the first gear;

a third inlet port adjacent the third mesh point for supplying oil to the disengaging gear teeth of the third gear and the second gear;

a third outlet port adjacent the third mesh point for accepting oil from the engaging gear teeth of the third gear and the second gear;

a fourth inlet port adjacent the fourth mesh point for supplying oil to the disengaging gear teeth of the internal gear and the third gear;

a fourth outlet port adjacent the fourth mesh point for accepting oil from the engaging gear teeth of the internal gear and the third gear;

at least one of the first inlet port and the third inlet port being connected with the scavenge pump inlet to supply oil therefrom;

at least one of the second outlet port and the fourth outlet port being connected with the scavenge pump outlet to supply oil thereto;

at least one of the second inlet port and the fourth inlet port being connected with the pressure pump inlet to supply oil therefrom; and at least one of the first outlet port and the third outlet port being connected with the pressure pump outlet to supply oil thereto.

9. The improvement of claim 8 further comprising a bypass for connecting at least one of the outlet ports to at least one of the inlet ports to bypass oil therebetween.

10. In an engine including an engine block, a power shaft mounted in the engine block for rotation about a power shaft axis, and a pressurized oil lubrication system; the improvement wherein said pressurized oil lubrication system comprises:

a scavenge sump;

an oil tank;

an oil distribution network;

an internal gear;

a first gear located within said internal gear and meshing with said internal gear at a first mesh point;

a second gear located within said internal gear and meshed with one of said first gear and said internal gear at a second mesh point ;

engaging gear teeth and disengaging gear teeth at each of the mesh points;

two inlet ports, each inlet port being associated with one of the mesh points for supplying oil to the disengaging gear teeth of the mesh point;

two outlet ports, each outlet port being associated with one of the mesh points for accepting oil from the engaging gear teeth of the mesh point;

one of the inlet ports being connected to the scavenge sump to supply oil therefrom;

one of the outlet ports being connected to the oil tank to supply oil thereto;

one of the inlet ports being connected to the oil tank to supply oil therefrom;

one of the outlet ports being connected to the oil distribution network to supply oil thereto.

11. The improvement of claim 10 wherein at least one of the gears is rotatably mounted to the engine block by a dowel fixed to the block and passing through a central opening in the at least one of the gears.

12. The improvement of claim 11 further comprising a cover plate for covering the gears and being aligned with the block by the dowel.

13. The improvement of claim 10 wherein at least one of the gears is formed from powdered metal.

14. The improvement of claim 10 further comprising a relief valve operably associated with the oil outlet and the oil inlet for regulating at least one of an oil outlet pressure and an oil outlet flow by selectively by-passing oil from the oil outlet to the oil inlet.

* * * * *